United States Patent
Egami

(12) 
(10) Patent No.: US 6,552,772 B2
(45) Date of Patent: Apr. 22, 2003

(54) APPARATUS AND METHOD FOR MANUFACTURING LIQUID CRYSTAL DISPLAY USING VOID-FREE ELASTIC SHEET

(75) Inventor: Norihiko Egami, Hirakata (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 261 days.

(21) Appl. No.: 09/774,560

(22) Filed: Feb. 1, 2001

(65) Prior Publication Data

US 2001/0021000 A1 Sep. 13, 2001

(30) Foreign Application Priority Data

Feb. 2, 2000 (JP) ........................................ 2000-025207

(51) Int. Cl.⁷ ............................................. G02F 1/1341
(52) U.S. Cl. ...................................... 349/187; 349/187
(58) Field of Search ................................ 349/187, 189, 349/190

(56) References Cited

U.S. PATENT DOCUMENTS 6,304,311 B1 * 10/2001 Egami et al. ................ 349/189

FOREIGN PATENT DOCUMENTS

JP 11264991 * 9/1999 ......... G02F/01/1339

* cited by examiner

Primary Examiner—Robert H. Kim
Assistant Examiner—Andrew Schechter
(74) Attorney, Agent, or Firm—Wenderoth, Lind & Ponack, L.L.P.

(57) ABSTRACT

A liquid crystal display 100 provided in which two transparent substrates are correctly positioned. For this purpose, a lower drawing station 24 disposed below a lower substrate 12 and movable in the horizontal direction includes holes 48 in its portion faced with the lower substrate. An upper drawing station 28 disposed above an upper substrate 14 includes holes 54 in its portion faced with the upper substrate. A void-free elastic sheet 50 is disposed between the lower substrate 12 and the lower drawing station 24 or between the upper substrate 14 and the upper drawing station 28.

11 Claims, 4 Drawing Sheets

APPARATUS AND METHOD FOR MANUFACTURING LIQUID CRYSTAL DISPLAY USING VOID-FREE ELASTIC SHEET

FIELD OF THE INVENTION

The present invention relates to an apparatus and method for manufacturing a liquid crystal display used for an image display panel of a computer apparatus, a television set, etc.

BACKGROUND OF THE INVENTION

FIG. 6 is a drawing schematically showing a cross section of a liquid crystal display. As shown in the drawing, the liquid crystal display 10 comprises a lower substrate 12 made of a transparent material (such as glass), an upper substrate 14 formed equally by a transparent material, and a liquid crystal material 16 held between the lower substrate 12 and the upper substrate 14. Although not shown in FIG. 6, electrodes are formed on surfaces of the lower substrate 12 and the upper substrate 14. The lower substrate 12 and the upper substrate 14 are bonded to each other by an adhesive 18 applied continuously along peripheral edge portions of the lower substrate 12 and the upper substrate 14. The adhesive 18 contains ball-like spacers 20 each having a certain diameter of about 5 μm, for example. This results in a constant gap, normally identical to the diameter of the spacing balls, between the lower and upper substrates 12 and 14.

The liquid crystal display 10 is manufactured through steps shown in FIGS. 7A to 7D. Specifically, the adhesive 18 capable of being hardened by the exposure of an ultraviolet ray is applied continuously along a peripheral edge portion of a top surface of the lower substrate 12 (FIG. 7A). Although not shown in the drawing, the adhesive 18 contains the spacers 20 shown in FIG. 6. A typical thickness of the adhesive 18 applied to the substrate 12 is about 30 μm. Then, the liquid crystal material 16 is dropped evenly within an area of the top surface of the lower substrate 12, defined by the adhesive 18 (FIG. 7B). Subsequent to this, the lower substrate 12 together with the liquid crystal material 16 is placed on a lower drawing station 24 through an elastic sheet 22 interposed in between (FIG. 7C). The upper substrate 14 supported by an upper drawing station 28 is thereafter lowered toward and pressed onto the lower substrate 12 in a vacuumed atmosphere 26. This causes the liquid crystal material 16 to extend in all directions between the substrates 12 and 14. The lower drawing station 24 is thereafter moved in the horizontal direction, to thereby correctly position the lower substrate 12 with respect to the upper substrate 14. In this condition, the upper drawing station 28 together with the upper substrate 14 is further descended, so that a pressure is applied until the gap between the lower and upper substrates 12 and 14 reaches a predetermined value substantially equal to the diameter of the spacers. At last, the adhesive 18 is exposed to an ultraviolet ray 32 irradiated from an ultraviolet lamp 30, so that it is hardened (FIG. 7D) to complete the liquid crystal display 10.

However, in the conventional apparatus for manufacturing a liquid crystal display, the elastic sheet 22 disposed between the lower substrate 12 and the lower drawing station 24 includes a number of small voids. Disadvantageously, each void expands in the vacuumed atmosphere 26. As a result, when biasing the upper substrate 14 to the lower substrate 12, the expanded voids causes an unwanted horizontal movement of the lower substrate 12 relative to the upper substrate 14 that has been correctly positioned to the other in the previous positioning stage.

SUMMARY OF THE INVENTION

Accordingly, an object of the present invention is to provide an apparatus and method for manufacturing a liquid crystal display, which prevents a lower substrate or an upper substrate from moving from the other while the upper substrate is pressed against the lower substrate, and thereby allows to obtain a liquid crystal display in which a lower substrate is correctly positioned with respect to an upper substrate.

To this end, an apparatus for manufacturing a liquid crystal display includes a lower drawing station disposed below the lower substrate and movable in the horizontal direction. The lower drawing station has a surface portion opposed the lower substrate and formed with a plurality of suction holes therein. An upper drawing station disposed above the upper substrate has a surface portion opposed the upper substrate and formed with a plurality of suction holes therein. An elastic sheet is provided between the lower substrate and the lower drawing station and/or between the upper substrate and the upper drawing station. Advantageously, the elastic sheet is made of member in which substantially no isolated void is enclosed therein. Examples of the material of the elastic sheet are silicon or fluorine material.

According to the present invention, the elastic sheet positioned between the substrate and the drawing station presents substantially no expansion in a vacuum. This allows the elastic sheet to deform only in the biasing direction (i.e., vertical direction) but not in another direction (i.e., horizontal direction) perpendicular to the biasing direction when it is pressed between the upper and lower substrates. Therefore, a positional relationship (i.e., horizontal relationship) between the upper and lower substrates, which has been determined in the previous stage, is maintained in the subsequent process made in the vacuum and also in the final product.

In another aspect of the present invention, the elastic sheet has a plurality of through-holes extending through the elastic sheet. This allows the vacuum to be applied through the elastic sheet to the adjacent substrate, preventing the movement of the substrate relative to the drawing station.

In addition, a method for manufacturing a liquid crystal display includes providing a lower drawing station having a lower support surface;

positioning an elastic sheet on the lower support surface, the lower elastic sheet being made of a void-free member in which substantially no independent void communicated to the atmosphere is included therein;

drawing the elastic sheet to the lower drawing station;

positioning a lower transparent substrate on the lower elastic sheet;

positioning a liquid crystal material on the lower transparent substrate;

providing an upper drawing station having an upper support surface;

positioning an upper transparent substrate on the upper support surface;

drawing the upper transparent sheet to the upper drawing station; and in a vacuum, moving the upper drawing station toward the lower drawing station so that the upper transparent substrate contacts with the liquid crystal material positioned on the lower transparent substrate and thereby the liquid crystal material is extended between the lower and the upper substrates.

DETAILED DESCRIPTION OF THE PREFERRED EMBODIMENTS

Figure 1:
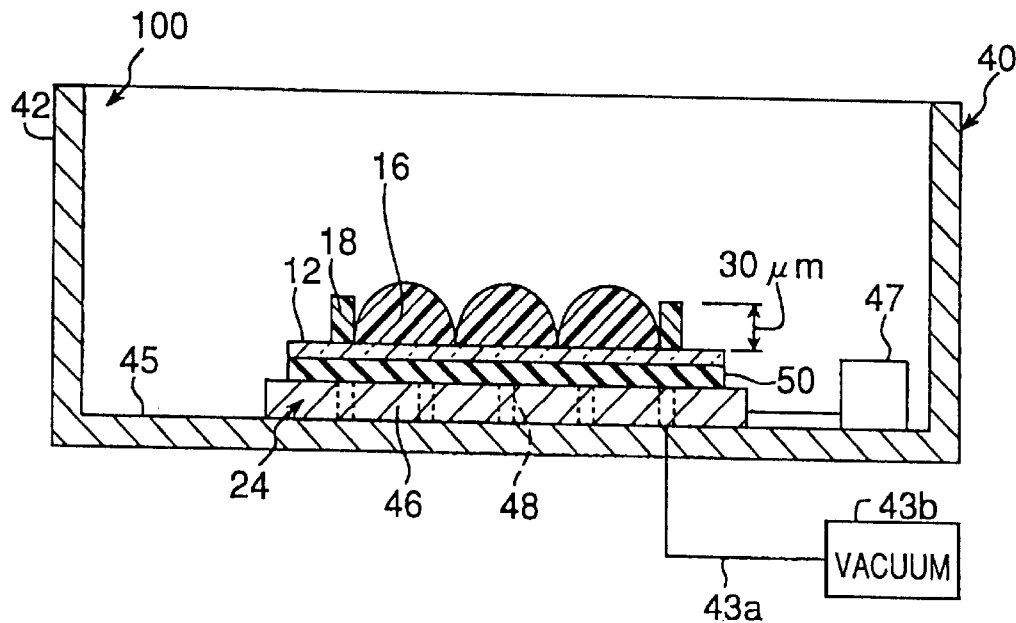
FIG. 1 is a cross sectional view showing a portion of the apparatus for manufacturing a liquid crystal display according to the present invention.

With reference to the attached drawings, apparatuses for manufacturing a liquid crystal display according to the preferred embodiments of the present invention will be described hereinafter. In the drawings, like parts are designated by like reference numerals.

First Embodiment

Figure 2:
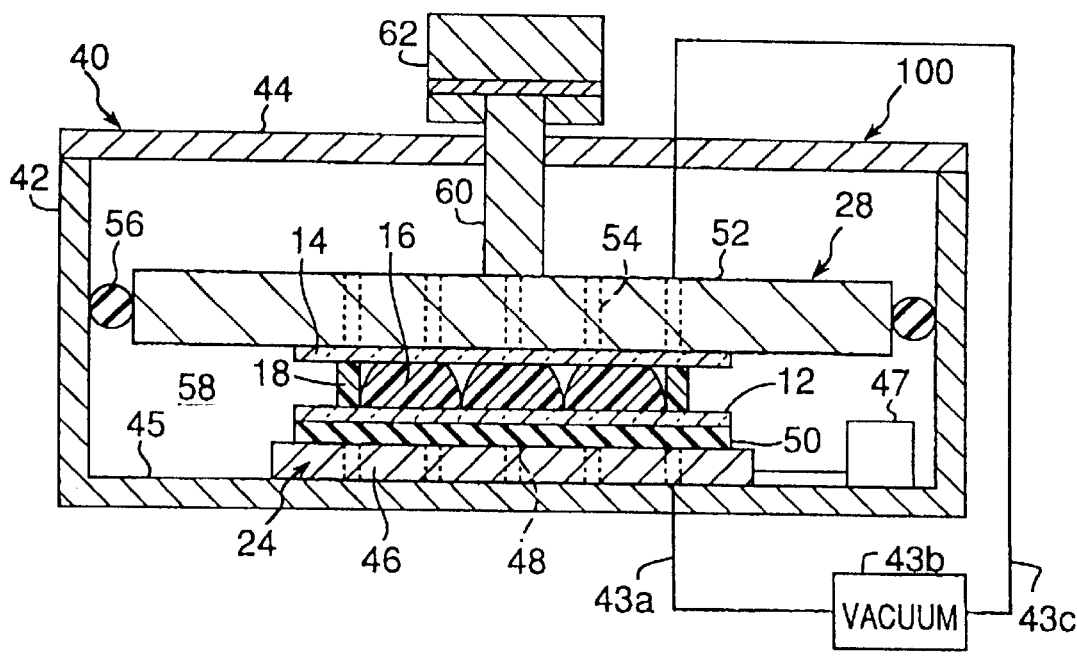
FIG. 2 is a cross sectional view which shows, as FIG. 1, the apparatus for manufacturing a liquid crystal display according to the present invention, and a process for manufacturing a liquid crystal display.
Figure 3:
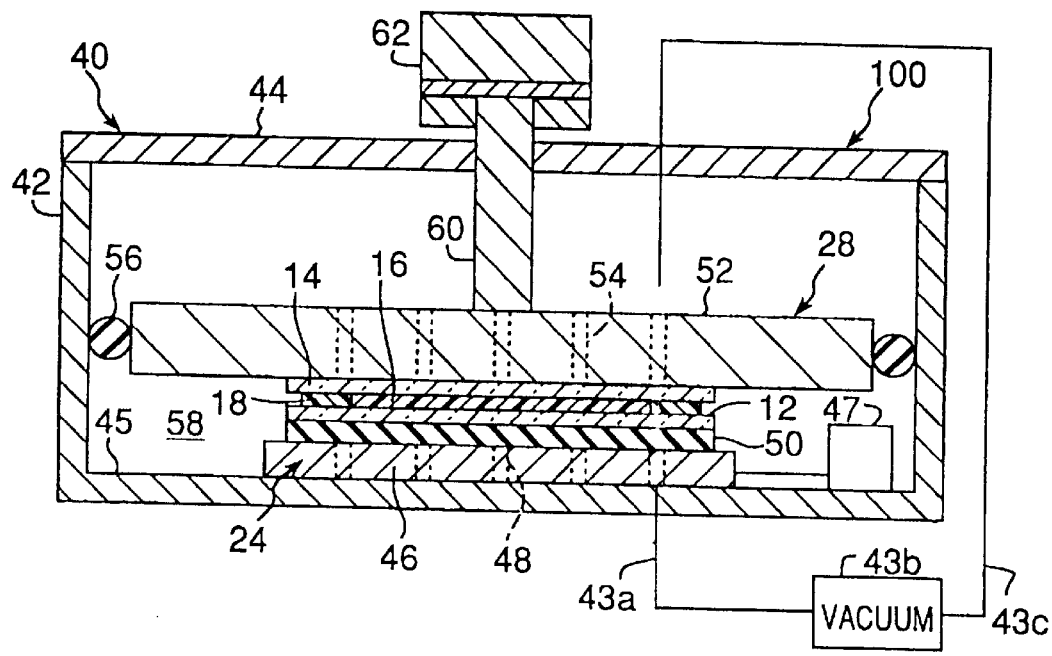
FIG. 3 is a cross sectional view which shows, as FIGS. 1 and 2, the apparatus for manufacturing a liquid crystal display according to the present invention, and a process for manufacturing a liquid crystal display.

FIGS. 1 through 3 show a part of an apparatus for manufacturing a liquid crystal display (hereinafter referred to "manufacturing system") 100 according to the first preferred embodiment and a process for manufacturing a liquid crystal display using the manufacturing system 100. In FIGS. 1 through 3, the manufacturing system 100 comprises a vacuum container 40. The vacuum container 40 includes a housing 42 that defines a chamber therein and an opening at the top portion of the chamber. The container 40 also includes a lid 44 for closing the chamber at the top opening of the housing 42. Further, a bottom portion or wall 45 of the container 40 has a number of small holes or passages (not shown) fluidly connecting between the interior and exterior of the container 40. The small holes are also fluidly connected through another passage 43a to a vacuum source or pump 43b so that the chamber can be vacuumed by the driving of the vacuum source 43b.

The lower drawing station 24, which is disposed on the bottom wall 45 in the container 40, includes a lower plate 46. The lower plate 46, formed at its top surface with a predetermined flatness, is positioned in the chamber and drivingly connected to a drive mechanism 47 by which the plate 46 is moved in a first horizontal direction and a second horizontal direction perpendicular to the first horizontal direction. Also, an entire or a part of the lower plate 46 is formed with a number of suction holes 48, each extending between its top and bottom surfaces, at a certain density or at certain intervals. This allows that when the lower plate 46 is placed on the bottom wall 45, the suction holes 48 are communicated with the vacuum source 43b. This in turn allows a member placed on the plate 46, i.e., an elastic sheet and the lower substrate described in detail below, to be attracted and securely held onto the top surface of the plate 46 by the introduction of vacuum into the suction holes 48.

An elastic sheet 50 is disposed on the top surface of the lower plate 46. Preferably, the sheet 50 may be made from a sheet including therein no isolated void having a diameter of about 0.5 mm or more (i.e., void-free sheet). Also preferably, the void-free sheet 50 represents an expansion rate of less than 1.1 under the gauge pressure of −100,980 Pa, which is a relative pressure against the atmospheric pressure that is defined as zero Pa. Examples of the elastic sheet 50 include silicon rubber and fluorine rubber.

The elastic sheet 50 bears a lower transparent substrate 12 holding an adhesive 18 and a liquid crystal material 16, both of which are applied or dropped in previous processes for manufacturing a liquid crystal display.

Then, an upper transparent substrate 14 is placed over and pressed onto the lower substrate 12 as shown in FIGS. 2 and 3, which is shown in FIG. 2. In this process, an upper drawing station 28 is positioned inside the housing 42. The upper drawing station 28 comprises a rigid upper plate 52. Preferably, the upper plate 52 includes a bottom surface having a predetermined flatness. Further, a portion of the upper plate 52, making a contact with the upper substrate 14, is formed with a number of suction holes 54 at a certain density or certain intervals. The suction holes 54 are communicated to the vacuum source 43b through a passage 43c so that a vacuum is introduced into the suction holes 54, holding a member, i.e., an upper substrate described in detail later, on the bottom surface of the upper plate 52.

A sealing member 56, preferably made from an endless elastic ring, is suitably disposed between an outer peripheral portion of the upper plate 52 and the housing 42, thereby creating a sealed space 58 under the upper plate 52. The upper plate 52 is supported at one end of a shaft 60 extending through a through-hole defined in the lid 44. The opposite end of the shaft 60 is drivingly connected to an elevating mechanism 62 secured to the lid 44 so that by the operation of the elevator mechanism 62 the upper plate 52 moves ups and downs.

In the operation for bonding the lower substrate 12 to the upper substrate 14, the upper substrate 14 is positioned on a predetermined bottom-surface area of the upper plate 52 and then held by the vacuum introduced in the suction holes 54. Then, the upper plate 52 holding the upper substrate 14 is placed in the housing 42 as shown in FIG. 2. At this moment, the lid 44 is fixed to the housing 42. Next, the vacuum is also introduced into the sealed space 58 of the housing 42, adjacent to the bottom surface of the housing, as well as the suction holes 48 of the lower plate 46.

Then, the elevator mechanism 62 is driven to thereby lower the upper plate 52. This results in that the upper substrate 14 is brought into contact with the adhesive 18 and the liquid crystal material 16 supported on the lower substrate 12, extending the adhesive 18 and the liquid crystal material 16 in all horizontal directions. The drive mechanism 47 then moves the lower plate 46 horizontally before a gap between the upper substrate 14 and the lower substrate 12 becomes a predetermined value (e.g., 5 µm), whereby the lower substrate 12 is positioned properly relative to the upper substrate 14 in the horizontal directions.

After positioning, the upper plate 52 is further lowered, and the upper substrate 14 is pressed against the lower substrate 12 until the gap between the upper substrate 14 and the lower substrate 12 becomes the predetermined value (e.g., 5 μm). At this stage, since the elastic sheet 50 made from void-free sheet presents substantially no expansion by the vacuum introduced into the sealed space 58, the lower substrate 12. stays still with respect to the horizontal directions as the upper substrate 14 is pressed against the lower substrate 12. Hence, once the lower substrate 12 and the upper substrate 14 are positioned in place with respect to the horizontal directions, the horizontal positional relationship between the lower substrate 12 and the upper substrate 14 is maintained until the final step of the manufacturing processes.

Figure 7A:
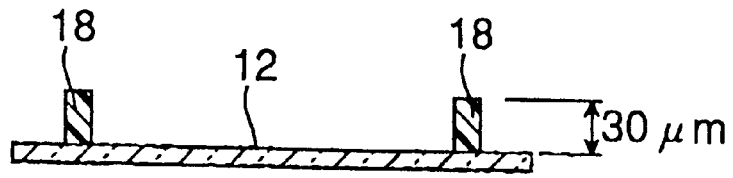
FIGS. 7A to 7D are cross sectional views for describing various processes for manufacturing a liquid crystal display.
Figure 7B:
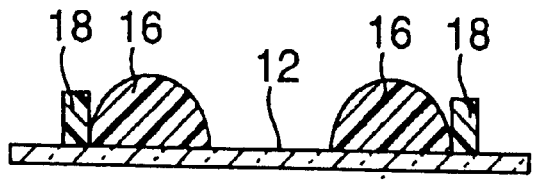
Figure 7C:
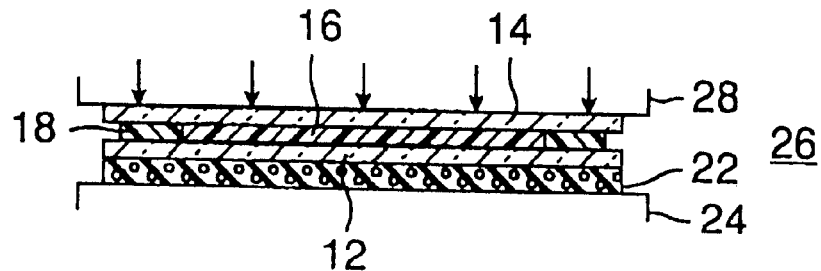
Figure 7D:
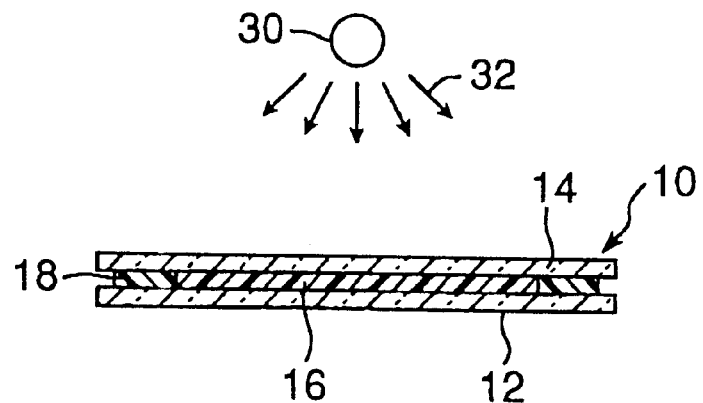

When the gap between the upper substrate 14 and the lower substrate 12 is reduced to the predetermined value, the vacuum is removed from the sealed space 58, and the upper plate 52 together with the liquid crystal display 10 is taken out from the housing 42. The liquid crystal display 10 is then exposed to an ultraviolet ray, hardening the adhesive 18 to obtain the final product (see FIG. 7D).

Second Embodiment

Figure 4:
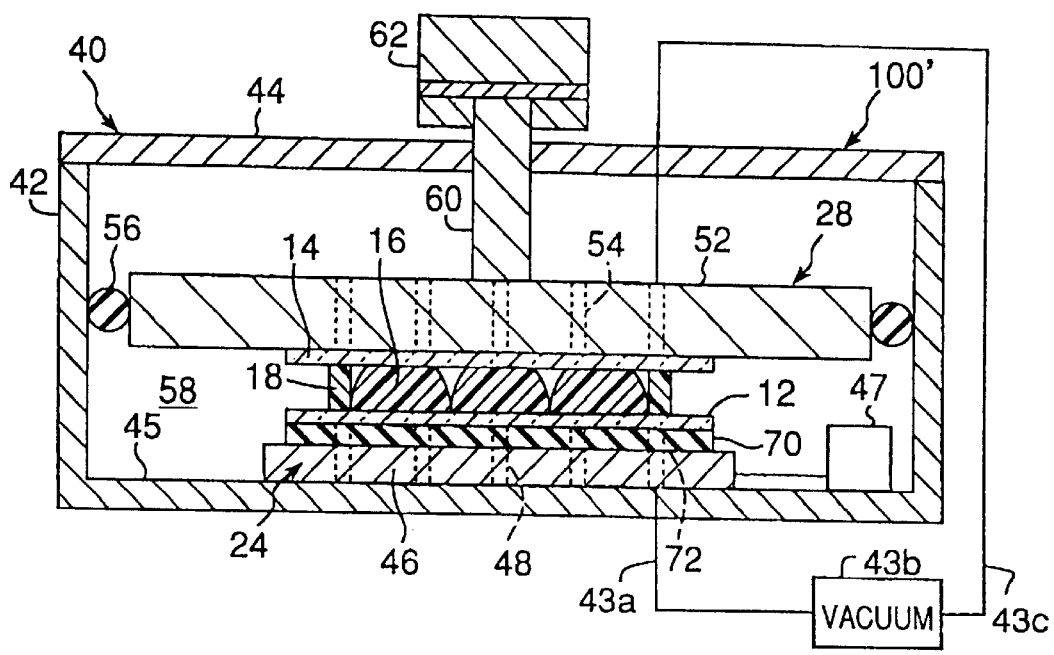
FIG. 4 is a cross sectional view showing the apparatus for manufacturing a liquid crystal display according to the other preferred embodiment of the present invention, and a process for manufacturing a liquid crystal display.

FIG. 4 shows another manufacturing system 100' according to the second embodiment. In the manufacturing system 100', an elastic sheet 70 provided on the lower plate 46 is formed with a plurality of through-holes 72. The through-holes 72 are arranged in the same manner or intervals as suction holes 48 formed in the lower plate 46. This allows that, when the elastic sheet 70 is placed in position on the lower plate 46, the through-holes 72 communicate with the corresponding suction holes 48, respectively.

With the arrangement of the manufacturing system 100', the vacuum introduced into the suction holes 48 of the lower plate 46 acts upon a bottom surface of the lower substrate 12 through the through holes 72 of the elastic sheet 70. This allows the lower substrate 12 to be correctly positioned on and relative to the lower plate 46. Also, a horizontal movement of the lower substrate 12 is effectively prevented. Further, by the existence of the through-holes 72, the lower substrate 12 is attached to the elastic sheet 70 without leaving any space therebetween. This in turn means that an elastic material having a higher deformability can be selected for the elastic sheet 70. In this instance, the lower substrate 12 deforms in accordance with the configuration of the opposing surface in the upper plate 14, ensuring a constant gap at every portion between the upper and lower substrates 12 and 14.

Advantageously, for an effective attraction of the lower substrate 12, an open ratio of the through-holes 72 in the elastic sheet 70, i.e., an area of the through-holes 72 to an area of the sheet being in contact with the lower substrate 12, is preferably about 10% or more. Also, an excessive enlargement of each through-hole 72 will results in a deformation of an opposing portion of the substrate 12. For this reason, a diameter of each through-hole 72 should be about 5 mm or less. Also, in order to allow the vacuum introduced in the suction holes 48 of the lower plate 46 to effectively act on the lower substrate 12, the through-holes 72 should be formed in a limited area where the elastic sheet 70 brings into contact with both the lower plate 46 and the lower substrate 12.

Third Embodiment

Figure 5:
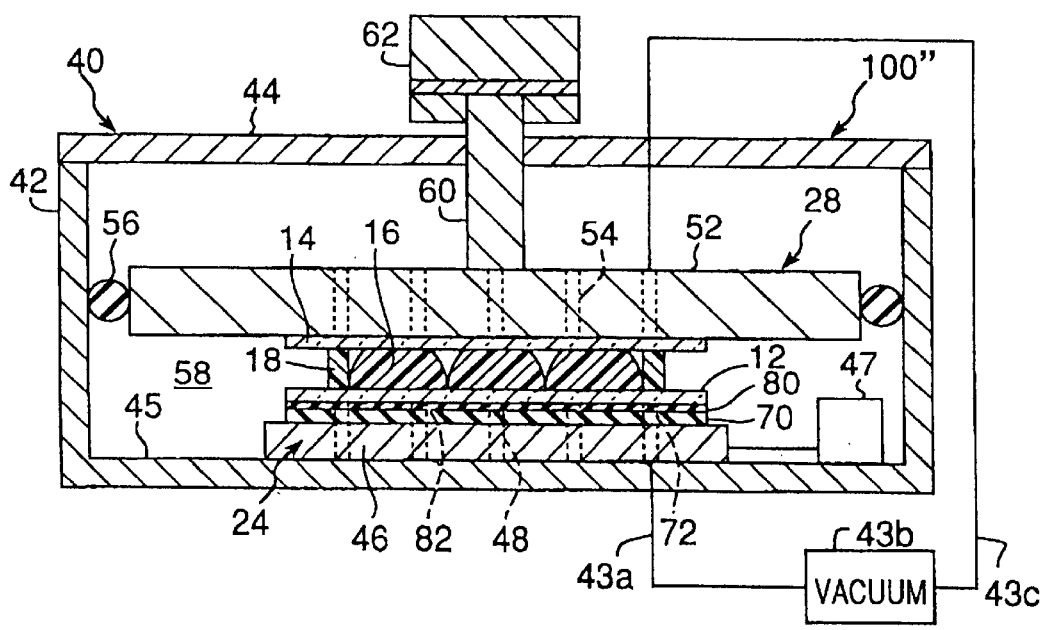
FIG. 5 is a cross sectional view showing the apparatus for manufacturing a liquid crystal display according to another preferred embodiment of the present invention, and a process for manufacturing a liquid crystal display.
Figure 6:
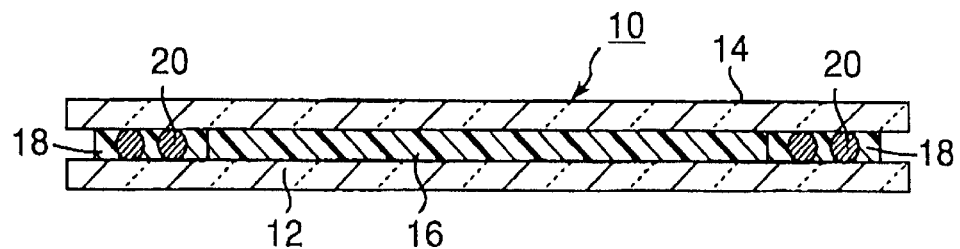
FIG. 6 is a cross sectional view schematically showing a liquid crystal display.

FIG. 5 shows another manufacturing system 100" according to the third embodiment. In the manufacturing system 100", similar to the second embodiment, the elastic sheet 70 is formed with through holes 72. In addition, a fissile sheet 80, preferably made of polyethylene, is provided between the elastic sheet 70 and the lower substrate 12. The fissile sheet 80 is formed with a plurality of through-holes 82 communicating with respective through holes 72 of the elastic sheet 70. This allows the vacuum introduced in the suction holes 48 of the lower plate 46 to be transmitted through the through-holes 72 of the elastic sheet 70 and the through-holes 82 of the fissile sheet 80 and thereby effectively applied to the lower surface of the lower substrate 12.

With the manufacturing system 100' using the fissile sheet 80, at the removal of the pressed liquid crystal display, the fissile sheet 80 allows the lower substrate 12 to be removed easily from the lower drawing station 24. Therefore, no unwanted force or any deformation caused thereby would occur in the lower substrate 12 at the separation of the lower substrate 12 from the lower drawing station 24.

Instead of the polyethylene sheet, a fluorine or polytetrafluoroethylene layer may be provided on a surface of the elastic sheet, opposing to the lower substrate. In this instance, the fluorine or polytetrafluoroethylene layer may be formed with through-holes corresponding to those of elastic sheet.

Although the elastic and the fissile sheets are disposed between the lower substrate and the lower plate in the previous embodiments, the elastic and the release sheets may be disposed between the upper substrate and the upper plate.

As described above, with the systems for manufacturing the liquid crystal display according to the present invention, in the process for holding and then pressing the liquid crystal material between the two substrates, the two substrates can be maintained in positions without any offset in the horizontal directions. Further, the liquid crystal display is removed from the system without any deformation of the liquid crystal display immediately after the substrates has been bonded to each other.

What is claimed is:

1. An apparatus for manufacturing a liquid crystal display, in which a liquid crystal material is dropped on a lower substrate formed by a transparent material, and an upper substrate formed by a transparent material is provided on the liquid crystal material in a vacuum, thereby holding the liquid crystal material between the lower and upper substrates, comprising;

a lower drawing station disposed below said lower substrate and movable in the horizontal direction, the lower drawing station having a surface portion opposed the lower substrate and formed with a plurality of suction holes therein; and an upper drawing station disposed above the upper substrate, the upper drawing station having a surface portion opposed the upper substrate and formed with a plurality of suction holes therein; and an elastic sheet provided between the lower substrate and the lower drawing station and/or between the upper substrate and the upper drawing station, the elastic sheet is made of member in which substantially no independent void communicated to the atmosphere is enclosed therein.

2. An apparatus for manufacturing a liquid crystal display of claim 1, wherein the elastic sheet is made of silicon or fluorine material.

3. An apparatus for manufacturing a liquid crystal display of claim 1, wherein the elastic sheet has a plurality of through-holes extending through the elastic sheet.

4. An apparatus for manufacturing a liquid crystal display of claim 3, wherein each through hole of said elastic sheet is positioned so as to communicate with an associated each one of the suction holes of the drawing station adjacent to the elastic sheet.

5. An apparatus for manufacturing a liquid crystal display of claim 3, wherein an inner diameter of the through holes is 5 mm or less.

6. An apparatus for manufacturing a liquid crystal display of claim 3, wherein the through-holes of the elastic sheet are formed in an area containing the suction holes of the drawing station adjacent to the elastic sheet.

7. An apparatus for manufacturing a liquid crystal display of claim 3, wherein the through-holes of the elastic sheet occupies 10% or more of an area containing the suction holes of the drawing station adjacent to the elastic sheet.

8. An apparatus for manufacturing a liquid crystal display of claim 3, wherein a surface of the elastic sheet faced with the lower substrate bears a sheet made of polyethylene, the polyethylene sheet being formed with through holes corresponding to the through-holes of the elastic sheet.

9. An apparatus for manufacturing a liquid crystal display of claim 3, wherein a surface of the elastic sheet faced with the lower substrate is provided with a layer made of fluorine or Teflon and formed with through holes corresponding to the through holes of the elastic sheet.

10. A method for manufacturing a liquid crystal display, comprising the steps of:

provasing a lower drawing station having a lower support surface;

positioning an elastic sheet on the lower support surface, the lower elastic sheet being made of a void-free member in which substantially no independent void communicated to the atmosphere is included therein;

drawing the elastic sheet to the lower drawing station;

positioning a lower transparent substrate on the lower elastic sheet;

positioning a liquid crystal material on the lower transparent substrate;

providing an upper drawing station having an upper support surface;

positioning an upper transparent substrate on the upper support surface;

drawing the upper transparent sheet to the upper drawing station; and in a vacuum, moving the upper drawing station toward the lower drawing station so that the upper transparent substrate contacts with the liquid crystal material positioned on the lower transparent substrate and thereby the liquid crystal material is extended between the lower and the upper substrates.

11. A method for manufacturing a liquid crystal display in accordance with claim 10, where in the elastic sheet includes a number of through-holes so that the lower substrate is drawn through the through-holes to the lower drawing station.

* * * * *

UNITED STATES PATENT AND TRADEMARK OFFICE
CERTIFICATE OF CORRECTION

PATENT NO. : 6,552,772 B2
DATED : April 22, 2003
INVENTOR(S) : Norihiko Egami

It is certified that error appears in the above-identified patent and that said Letters Patent is hereby corrected as shown below:

Column 6,
Line 41, insert -- said apparatus -- before "comprising".
Line 42, change "disposed below said lower substrate and" to -- that is --.
Line 43, change "the" (first occurrence) to -- a --.
Line 44, change "a surface portion opposed" to -- an upper surface portion for opposing --.
Line 45, change "substrate and" to -- substrate, the lower drawing station being --.
Line 47, change "disposed above the upper substrate, the upper drawing station having a surface" to -- lower surface --.
Line 49, change "opposed" to -- for opposing --; change "substrate and" to -- substrate, the upper drawing station being --.
Line 53, change "the elastic" to -- wherein the elastic --.
Line 54, change "made of member in which substantially no independent void communicated to the atmosphere is enclosed therein" to -- formed of a generally void-free sheet of material --.
Line 58, change "silicon or fluorine material" to -- silicon rubber or fluorine rubber material --.

Column 7,
Line 7, insert -- that is positioned -- before "adjacent".
Line 17, change "faced with" to -- facing --.
Line 19 change "Teflon" to -- polytetrafluoroethylene --.
Line 23, delete "the steps of".

Signed and Sealed this

Twenty-ninth Day of June, 2004

JON W. DUDAS
*Acting Director of the United States Patent and Trademark Office*